July 31, 1928.
A. L. GENTER
SCRAPER FOR ROTARY FILTERS
Filed Jan. 9, 1920
1,678,639
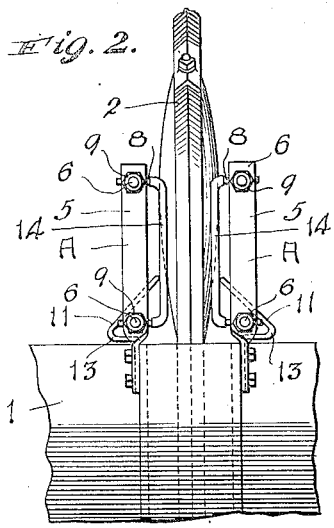
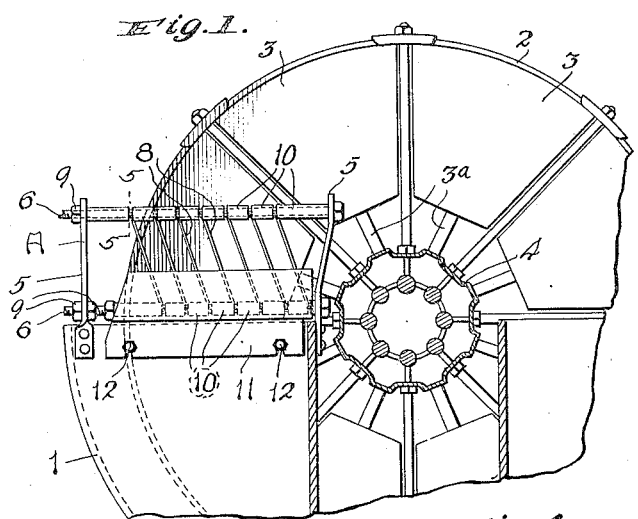
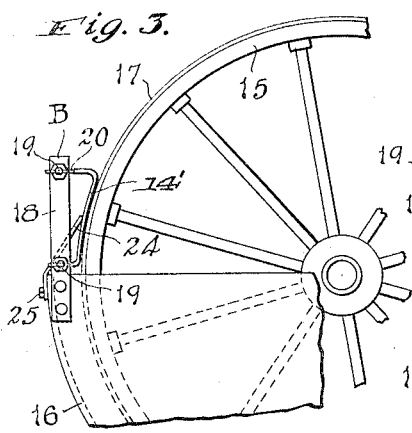
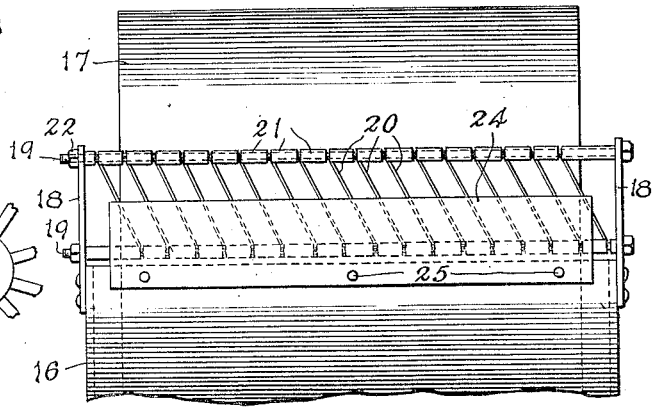
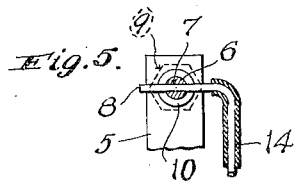
INVENTOR
BY
ATTORNEY Patented July 31, 1928.

1,678,639

UNITED STATES PATENT OFFICE.

ALBERT L. GENTER, OF SALT LAKE CITY, UTAH, ASSIGNOR TO UNITED FILTERS CORPORATION, OF NEW YORK, N. Y., A CORPORATION OF DELAWARE.

SCRAPER FOR ROTARY FILTERS.

Application filed January 9, 1920. Serial No. 350,486.

This invention relates to scrapers for removing the filter cakes of moist solids deposited during the filtering action from the filter elements of continuous vacuum filters.

The conventional filter apparatus of the vacuum type usually embody as the filter element a rotary drum, disc or leaf, which is revolved in a tank containing the liquid being filtered, the said filter element being covered by a filter medium, such as fabric, through which the liquid is drawn by vacuum into the interior of the drum, disc, or leaf from which it is conveyed to desirable points such as a filtrate tank, the solids suspended in the liquid being deposited or collected upon the exterior of the filter medium in the form of a cake. As the drum, disc or leaf revolves, portions thereof are raised out of the liquid whereupon the vacuum draws substantially all the moisture from the filter cake of solid matter above the liquid. At a suitable point in the rotation of the filter element, after the cake has been sufficiently dried, the vacuum is automatically cut off from a certain portion of the filter element, and simultaneously a blast of compressed air is forced outwardly through the filter fabric at said portion of the filter element freed from the vacuum. This "blow-back" of compressed air tends to loosen the cake from the filter element, and arranged at a suitable point on the filter casing is a scraper which engages the filter cake just acted upon by the compressed air to remove the filter cake from the filter element. The common type of scraper for this purpose now in use is a thin sheet of metal which is supported with one edge thereof in close proximity to the filter element so as to dislodge the filter cake from the filter medium. Practice has shown that the working edge of such a scraper rapidly becomes sharp like a knife edge due to constant abrasion of the solid matter in the filter cake, quickly wears away, and is liable to tear or injure the filter medium. The conventional type of rotary drum vacuum filter is provided with a wire winding externally of the filter medium to hold the filter medium in place and especially to reinforce it during the action of the blast of compressed air or blow-back. The engagement of these wires with the scraper rapidly wears away both the wires and scraper, either of which is replaceable only with difficulty and loss of time.

The objects of my invention are to provide an improved construction for preventing abrasion of the old type of scraper; to provide an improved scraper which will not be injured or worn by the abrasive action of the filter cake; to obtain a scraper which eliminates the necessity of wire windings on the rotary drum type of vacuum filter; to secure a scraper which will easily conform to the bulging exterior of the filter medium under the action of the blast of air so as not to injure the filter medium; to provide a scraper which will effectively and thoroughly remove the filter cake from the filter element; and to obtain other objects and results as may be brought out by the following description.

Referring to the accompanying drawings in which like numerals of reference designate the same parts throughout the several views, Figure 1 is a fragmentary sectional view of a conventional vacuum filter of the revolving filter leaf type, showing a scraper embodying my invention applied thereto, the filter leaf and scraper being shown in side elevation.

Figure 2 is an enlarged fragmentary view thereof, viewing the same from a position at right angles to that of Figure 1.

Figure 3 is a fragmentary diagrammatic side elevation of a vacuum filter of the revolving drum type, showing another form of my scraper applied thereto.

Figure 4 is a front elevation thereof.

Figure 5 is a sectional view on the line 5—5 of Figure 1, showing the manner of supporting the scraping wires.

In the specific embodiment of the invention illustrated by Figures 1 and 2, the numeral 1 designates the tank of a filter adapted to contain the liquid to be filtered. Revolubly mounted in said tank in a conventional manner are one or more filter leaves 2, each comprising a plurality of filter sectors 3, each of which is a hollow member covered with a filter medium, such as fabric, and each of which has an outlet nipple 3ª communicating with the main outlet pipe 4. During the filtering operation, the filter leaf is slowly revolved, and a vacuum is maintained in the pipe 4 which draws liquid from the tank 1 through the filter medium causing the solid matter to collect on the exterior thereof in the form of a cake. As the sectors 3 are raised from the liquid, the vacuum draws substantially all the moisture from the cake of solid matter thereon, and at a suitable point in the revolution of the leaves and after the solid matter is sufficiently dry, the vacuum is automatically cut off from one sector of each leaf. Simultaneously therewith a blast of air is forced through the said sector which tends to loosen the cake thereon, whereupon the cake passes under a scraper, which removes it. The above construction and operation is all conventional and old, and no claim thereto is made.

Arranged at a suitable point on the filter tank 1, so as to be adjacent the sector of the corresponding leaf acted upon by the blast of air are scraping devices A, one of which is arranged upon each side of the filter leaf, for removing the filter cake from the filter leaf. These scraping devices A are identical in construction so that a description of one will suffice for both. A pair of spaced vertically disposed brackets 5 are secured upon the tank 1, along the side of the filter leaf and spaced therefrom, said brackets supporting and being connected by a pair of vertically spaced horizontally disposed bolts 6 which are arranged substantially parallel with the side of the filter leaf and are provided with slots 7 to receive the ends of spring scraping wires 8, (see Figure 7). The said bolts 6 are provided with clamping nuts 9 for securing them in the brackets 5.

The scraping wires 8 extend diagonally between the bolts 6 and have their ends bent at substantially right angles and inserted through the slots 7 in the bolts. These wires 8 are spaced from each other and from the filter leaf 2, so as to engage the filter cake thereon, the said wires being clamped in proper spaced relation by means of the spacing sleeves 10 arranged on said bolts 6, one of which sleeves is arranged between each two wires. By tightening the clamping nuts 9, the sleeves 10 are forced tightly against the respective wires so as to securely hold them in proper position.

As the sector 3 of the leaf is acted upon by the blast of compressed air the filter medium thereof is bulged outwardly as shown in Figure 2, and as the sector passes the wires 8, the wires act as ploughs or scrapers to remove the filter cake carried by the filter medium. The disintegrated cake is then deflected outwardly away from the tank 1 by the downwardly inclined deflector plate 11 which is rigidly mounted by bolts 12 on the tank 1. The upper edge of this reflector plate rests upon the outside of the wires 8 as shown by Figure 2, so as to be held away from the filter cake and filter leaf. The wires 8 are resilient so that they will yield and conform to the bulging exterior of the filter leaf sector so as not to injure the same, and the deflector plate 11 is preferably longitudinally bent, as at 13, so as to allow it to yield with the wires 8. For the purpose of protecting the wires 8 from the abrasive action of the filter cake, and also to prevent injury to the filter medium, a tubular covering 14 of suitable cushioning material, such as rubber, is drawn over that portion of each wire 8 which engages the filter cake. It will be noted that the wires 8 also provide an extended re-inforcing surface for the filter leaf sector under action of the blast of compressed air to prevent bursting or tearing of the filter medium under inflation.

With slight modification, a scraping device of the character above described may be used in connection with a rotary drum type of vacuum filter as shown diagrammatically by Figures 3 and 4. The drum comprises a frame 15 revolubly mounted in a conventional manner in a tank 16 which receives the liquid to be filtered, said drum being covered with a filter medium 17, such as fabric, through which the liquid is drawn from the tank 1 to the interior of the drum by vacuum as above described, the solid matter in the liquid collecting on the filter medium in the form of a cake. A certain portion of the filter medium above the liquid may be automatically subjected to a blast of compressed air from within the drum, simultaneously with the automatic cutting off of the vacuum upon said portion of the filter medium, in a manner similar to that above described in connection with Figures 1 and 2.

The scraping device B for removing the filter cake from the filter medium, is substantially the same as that shown in Figures 1 and 2, except that the brackets 18 are mounted on the ends of the tank 16, and the bolts 19 extend longitudinally of the drum 15, the full length thereof. The spring scraping wires 20 are arranged diagonally between the bolts 19 and are secured thereto by the spacing sleeves 21 which are clamped against them by the nuts 22. The wires 20 are longitudinally curved, as shown in Figture 3 to conform to the periphery of the drum 15, and a deflector plate 24 similar to the deflector 11 is secured longitudinally of the tank 16 by fastening members 25, said deflector plate serving to direct the removed cake from the tank 16. The wires 20 are also provided with a tubular covering 14' similar to the covering 14 and for the same purpose. As the filter cake passes under the wires 20, the wires act as ploughs or scrapers to remove the filter cake from the drum in a manner similar to that above described in connection with Figure 1, and the wires yield to conform to the bulging of the filter medium due to the compressed air blast. With this construction, it will be noted that the conventional wire windings for the rotary filter drum may be eliminated since their function is performed by the scraping wires 20, which prevent displacement or tearing of the filter medium under the pressure of the air blast. However, my improved scraper is also adapted for use with the conventional wire wound rotary filter drum.

While I have illustrated and described a few of the possible ways in which the benefits of my invention may be obtained, it is to be understood that they are only examples for the purposes of illustration, and I do not desire to be limited to the specific constructions shown or to the application of my invention in the specific types of scrapers described. Many modifications and changes can be made in the construction of my invention by those skilled in the art without departing from the spirit or scope of the invention.

Having thus described my invention, I claim:

1. In a rotary continuous filter, the combination of a filter element, of scraping means therefor comprising a support, a plurality of diagonally arranged scraping wires attached to said support and conforming to the surface of the filter element, said wires being spaced apart and arranged in parallel relation and positioned to engage and remove the cake from the filter element.

2. In a rotary continuous filter, the combination of a filter element, a cake removing means therefor comprising a bracket support arranged at the side of the filter element, scraping members extending diagonally between members of the bracket support, said scraping members having cake engaging portions and resilient coverings for said cake engaging portions.

3. A scraper for a filter medium comprising a bracket support, a plurality of diagonally arranged wires positioned in parallel relation and having the free ends of all the wires bent outwardly and attached to the bracket support in spaced relation, the intermediate cake engaging portion of each wire being resilient to conform to the bulging exterior of the medium when in cake discharging position and a deflector plate to receive and direct the discharge of the cake when removed from the filter medium.

ALBERT L. GENTER.